United States Patent [19]

Spethmann

[11] 4,044,947
[45] Aug. 30, 1977

[54] CONDITION AND VOLUME CONTROL FOR AIR CONDITIONING SYSTEM MIXING DAMPERS

[75] Inventor: Donald H. Spethmann, Arlington Heights, Ill.

[73] Assignee: Honeywell Inc., Minneapolis, Minn.

[21] Appl. No.: 691,668

[22] Filed: June 1, 1976

[51] Int. Cl.² ............................................. F24F 13/04
[52] U.S. Cl. ...................................... 236/13; 165/16
[58] Field of Search ...................... 165/16; 236/49, 13; 62/179, 427

[56] References Cited
PUBLICATIONS

Air Conditioning, Heating & Ventilating, June, 1960, p. 57.

Control systems for Heating, Ventilating & Airconditioning, pp. 71-73, R. W. Haines, Van Nostrand, 1971.

Primary Examiner—William E. Wayner
Attorney, Agent, or Firm—Trevor B. Joike

[57] ABSTRACT

In an air conditioning system wherein the outdoor air and recirculated air mixing dampers are operated to control the volume and condition, such as temperature, of the mixture of outdoor air and return air to be discharged to at least one zone, a control apparatus is disclosed having sensors for sensing the condition and volume of the mixture and a control system responsive to the sensors for controlling the operation of the outdoor air and recirculated air dampers for maintaining a predetermined condition and a predetermined volume of the mixture. In addition, an exhaust air damper may also be provided, controlled by the control system, for regulating the amount of air returned for the system.

20 Claims, 6 Drawing Figures

CONDITION AND VOLUME CONTROL FOR AIR CONDITIONING SYSTEM MIXING DAMPERS

BACKGROUND OF THE INVENTION

The invention relates to air conditioning systems and particularly to the control of the mixing dampers in such systems for regulating both the condition, such as temperature, and the volume of air to be discharged to the zones under control of the system.

The usage of variable air volume systems has attained significant proportions in the recent past, typically in large high-rise buildings, to handle the large interior cooling loads which are relatively constant. These systems generally include an outdoor air duct and an outdoor damper therein for supplying fresh air to the building. This fresh air is mixed with recirculated air through a recirculated air duct and a recirculated air damper and supplied through air treating apparatus to be discharged to the various rooms of the building. The air treating apparatus may include a filter for eliminating dirt particles from the air, a preheat coil for establishing a predetermined minimum temperature of the filtered air particularly in those climates where the outdoor temperature, at least occasionally, drops below freezing, a cooling coil for cooling and dehumidifying the mixed air and a fan for discharging this treated air to the zones or rooms of the building. Each zone, typically, has a temperature sensor connected to a damper for controlling the amount of air supplied to the zone.

The use of outdoor air, recirculated air and exhaust air dampers had long been a standard way of controlling the mixture of outdoor air and return air to provide a controlled temperature of the mixed air. Such systems are designed to take advantage of the cooling capacity of the outdoor air to thereby reduce the amount of energy needed to control the air at the desired conditions. For example, if it is desired to control the temperature within a building at 75° F and the outdoor air is below 75° F, a large percentage of outdoor air may be introduced into the building rather than having to cool return air to the desired temperature. Therefore, a substantial portion of the outdoor air will be introduced into the building and a substantial portion of the return air will be exhausted from the building.

In the present variable air volume fan systems, the outdoor air, recirculated air and exhaust air mixing dampers are operated to insure that, as the outdoor air damper is opened, the recirculated air damper is closed and the exhaust air damper is opened. Thus, the outdoor air and exhaust air dampers operate in the same sense whereas the recirculated air damper operates in the opposite sense. In these prior systems, the outdoor air, recirculated air and exhaust air mixing dampers control only the temperature of the mixed air such that, if the system is to be a variable air volume system, a fan inlet vane damper or a fan discharge damper or other apparatus must be additionally provided to control the volume of air supplied to the system. If a return fan is used it requires volume control also. The present invention eliminates the need for a fan inlet vane damper or a fan discharge damper or similar apparatus by controlling the outdoor air and recirculated air dampers, and the exhaust air damper if desired, for in turn controlling the condition, such as temperature, of the mixed air and the volume of the mixed air delivered to the zones.

SUMMARY OF THE INVENTION

A control apparatus is provided for controlling the outdoor air damper and recirculated air damper of an air conditioning system for maintaining a predetermined condition, such as temperature, and a predetermined volume of the air to be discharged to the zones supplied by the air conditioning system. In this manner, separate volume control dampers may be eliminated by requiring the outdoor air and recirculated air mixing dampers to perform both the functions of controlling the condition of the mixture of outdoor air and recirculated air and controlling the volume of the mixture of air supplied to the zones. "Condition" is defined herein as temperature, humidity or similar quality.

The control apparatus may further comprise variable gain amplifiers having a first input connected to a temperature sensor which senses the temperature of the mixed air, either upstream or downstream of the fan, and a second input connected to at least one volume sensor responsive to the volume of air moving through the system. The volume sensor can be any type of sensor which gives an indication of the volume of air in a system and may be a pressure sensor. The outputs from the variable gain amplifiers are connected to the appropriate outdoor air damper and/or recirculated air damper for regulating the condition and volume of the mixture of outdoor air and return air supplied to the zones.

The volume sensor or sensors may be connected to control the gain of the amplifiers. Thus, upon an increase in the static pressure in the system, the gain of the amplifiers is adjusted to reduce the volume of air supplied to the system by the outdoor air and recirculated air damper. The volume of the system return is regulated by the same type control of exhaust and recirculated air dampers.

BRIEF DESCRIPTION OF THE DRAWINGS

These and other features of the invention will become apparent upon a review of the drawings in which.

DETAILED DESCRIPTION OF THE DRAWINGS

Figure 1:
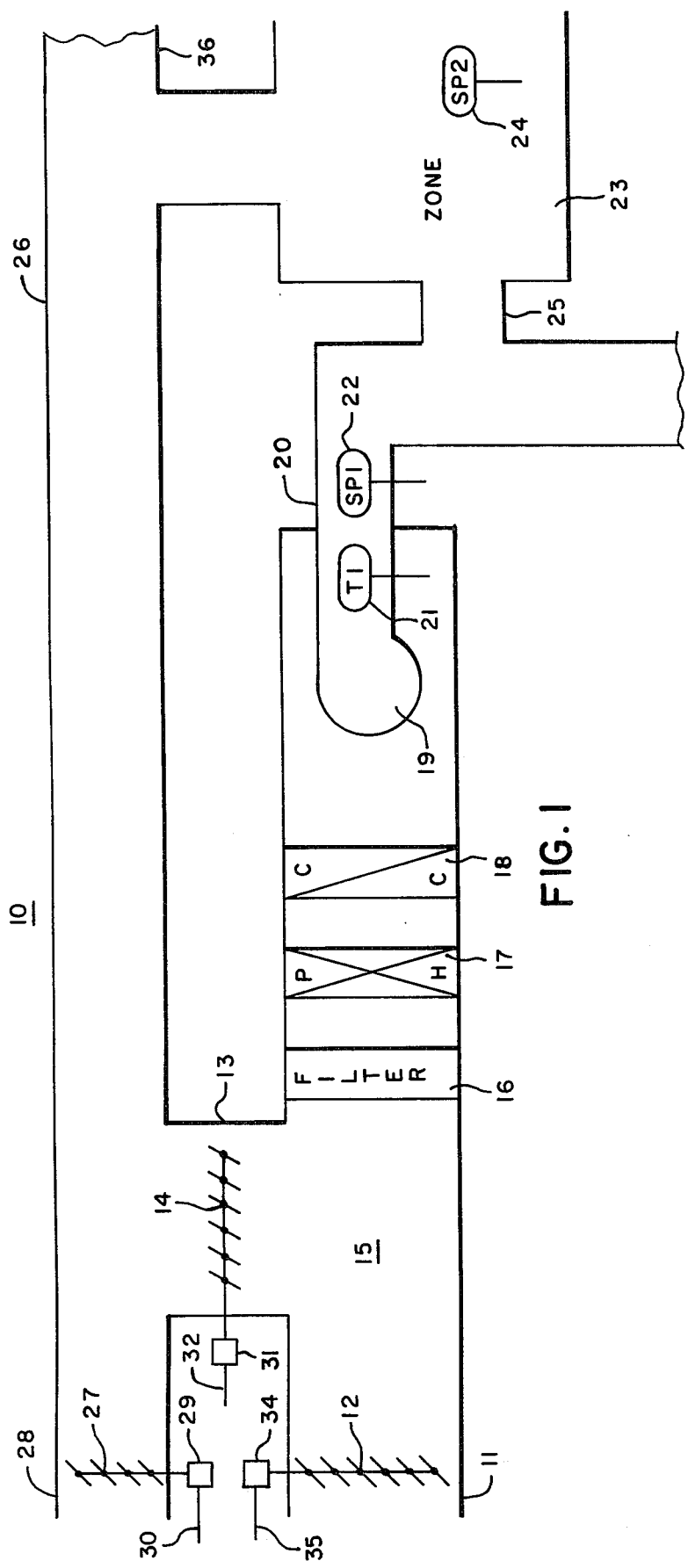
FIG. 1 is a system diagram of an air conditioning system incorporating the present invention.

In FIG. 1, outdoor air duct 11 having damper 12 forms a source of outdoor air for the building in which air conditioning system 10 is located. A source of recirculated air formed by recirculated air duct 13 and damper 14 supplies recirculated air to chamber 15 where the recirculated air is mixed with the outdoor air. The mixture of recirculated air and outdoor air may then be filtered by filter 16, preheated by preheater 17 and cooled by cooling coil 18. The air issuing from cooling coil 18 is then supplied to fan 19 for distribution to a plurality of zones, only one of which is shown in FIG. 1.

The air discharged by fan 19 is supplied to duct 20 in which is located a condition sensor such as temperature sensor 21 and a volume sensor such as static pressure sensor 22 although these sensors may be located at other points in the system where the outputs of these sensors will provide an indication of the condition and volume of the mixture of recirculated air and outdoor air or conditioned supply air. The air duct 20 is then distributed to the zones within a building. Zone 23 may be provided with a second sensor such as static pressure sensor 24 to represent the static pressure level in the building and control return air volume in duct 36.

Although not shown, zone 23 may have a condition sensor, such as a thermostat, for sensing the condition of the air within the zone and connected to a damper and/or reheat coil or similar apparatus in duct 25 which connects duct 20 to zone 23 for controlling the condition and/or the volume of the air within zone 23.

Each zone, such as zone 23, has a return air duct 26 connected to system return air duct 36 which supplies the source of recirculated air comprising duct 13 and damper 14. A portion of the system return air is exhausted from the building through exhaust duct 28 and exhaust damper 27 to match or compensate for the outside air introduced through damper 12.

Exhaust damper 27 is operated by actuator 29 having a source of, for example, pneumatic pressure in line 30 to control the operation thereof. Recirculated air damper 14 is operated by actuator 31 supplied with pneumatic pressure through line 32, and outdoor air damper 12 is operated by actuator 34 supplied with pneumatic pressure through line 35.

As pointed out, mixing dampers 12 and 14, and if desired damper 27, have been previously arranged to control the condition of the mixed air in chamber 15 for supply to the fan and then to the zones. If the system also included variable air volume control, either the fan 19 was provided with an inlet vane damper or the output of the fan was provided with a discharge damper for controlling the volume of air supplied to the zones. The present invention, however, regulates the dampers 12 and 14 not only to mix the air in a proportion to control the condition, such as temperature, of the air in chamber 15 but also regulates the dampers in a fashion to control the volume or pressure of air supplied to the zones.

Thus, the control apparatus must operate the outdoor air and recirculated air dampers oppositely to one another for condition control but identically, in direction, to one another for volume control. For example, when the temperature of the mixture of outdoor air and recirculated air is to be controlled, the dampers 12 and 14 must be actuated in a direction opposite to one another. However, when the volume of air supplied to chamber 15, and thereby to the fan 19, is to be regulated, the dampers 12 and 14 must be operated in the same sense and when the volume of return air in duct 36 is to be regulated, dampers 27 and 14 must be operated in the opposite sense. An apparatus to provide this operation is shown in FIG. 2.

Figure 2:
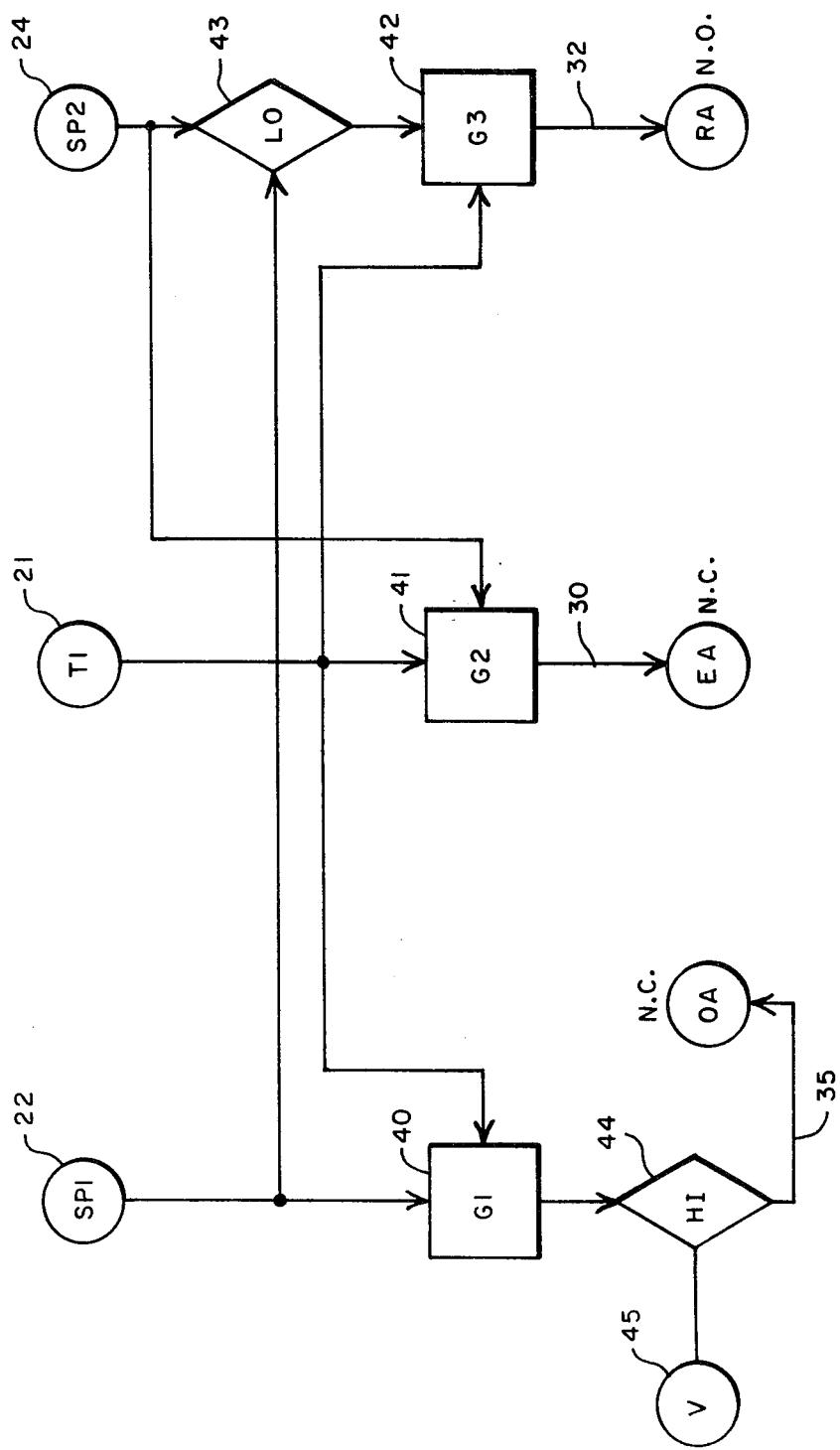
FIG. 2 is a schematic diagram of the control apparatus of the invention.

In FIG. 2, static pressure sensors 22 and 24 may be PP905 static pressure sensors manufactured by Honeywell Inc. These sensors are capable of both direct acting and reverse acting capability dependent upon which ports are connected into the system. In the system shown in FIG. 2, static pressure sensor 22 is connected for reverse action and static pressure sensor 24 is connected for direct action. Variable gain amplifier 40, shown in more detail with respect to FIG. 6, has one input connected to static pressure sensor 22 and a second input connected to direct acting temperature sensor 21. The output from amplifier 40 is supplied to circuit 44 which selects the higher of the pressures from amplifier 40 or source 45 and connects this higher pressure to pneumatic line 35 which is connected to outdoor damper actuator 34. Source 45 is arranged to prevent outdoor air damper 12 from being closed beyond a predetermined minimum. Thus, when the output pressure from amplifier 40 drops below the pressure as established by source 45, the pressure from source 45 will be connected through high selector circuit 44 to line 35 and then to actuator 34. The highest pressure selector is shown in more detail in my U.S. Pat. No. 3,692,240.

Variable gain amplifier 41 has one input connected to thermostat 21 and a second input connected to static pressure sensor 24 and has an output directly connected to line 30 which supplies pneumatic pressure to actuator 29 for controlling the position of exhaust air damper 27. Variable gain amplifier 42 has a first input from low pressure selector 43 and a second input from thermostat 21 and provides an output to line 32 which is connected to actuator 31 for controlling the position of recirculated air damper 14. The low pressure selector 43 has a first input from static pressure sensor 24 and a second input from static pressure sensor 22. The low pressure sensor is arranged to supply to variable gain amplifier 42 the lowest pressure of either the pressures from static pressure sensor 24 or static pressure sensor 22. This lowest pressure selector is shown in more detail in my above mentioned U.S. Pat. No. 3,692,240. In this manner, the pressure sensor 22 or 24, having the lowest output pressure, controls the position, in accordance with the pressure from thermostat 21, of recirculated air damper 14.

Figure 5:
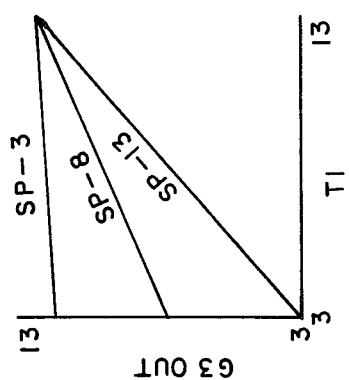
FIGS. 3–5 are the input versus output graphs of the variable gain amplifiers shown in FIG. 2; and, FIG. 6 is a more detailed schematic of the control apparatus shown in FIG. 2.
Figure 4:
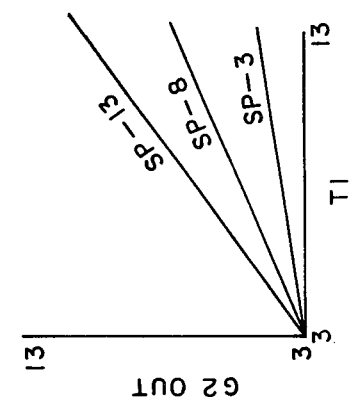
Figure 3:
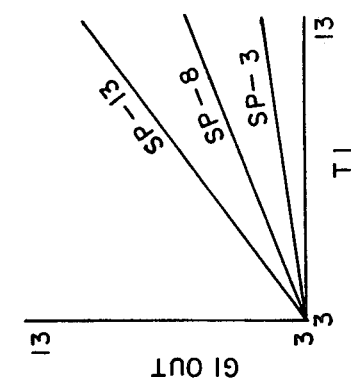

As shown in FIGS. 3, 4 and 5, variable gain amplifiers 40 and 41 are arranged to be direct acting amplifiers and amplifier 42 is arranged to be a reverse acting amplifier. The graphs in these figures show that the response curve for the amplifiers depends upon the static pressure input from static pressure sensor 22 or 24. Specifically, any change in static pressure as sensed by sensors 22 or 24 will change the gain of the amplifier to thus change the amplifiers capacity for modulating the position of the damper connected thereto in response to the output from the thermostat. For example, if the static pressure sensor 22 is arranged to provide an output having a range from 3 psi to 13 psi depending upon the static pressure sensed and if that static pressure which is sensed by sensor 22 is high, its output will be 3 psi since it is a reverse acting static pressure sensor. Therefore, any change in temperature will impact the outdoor air damper less than if the output from static pressure sensor 22 was at 13 psi.

Figure 6:
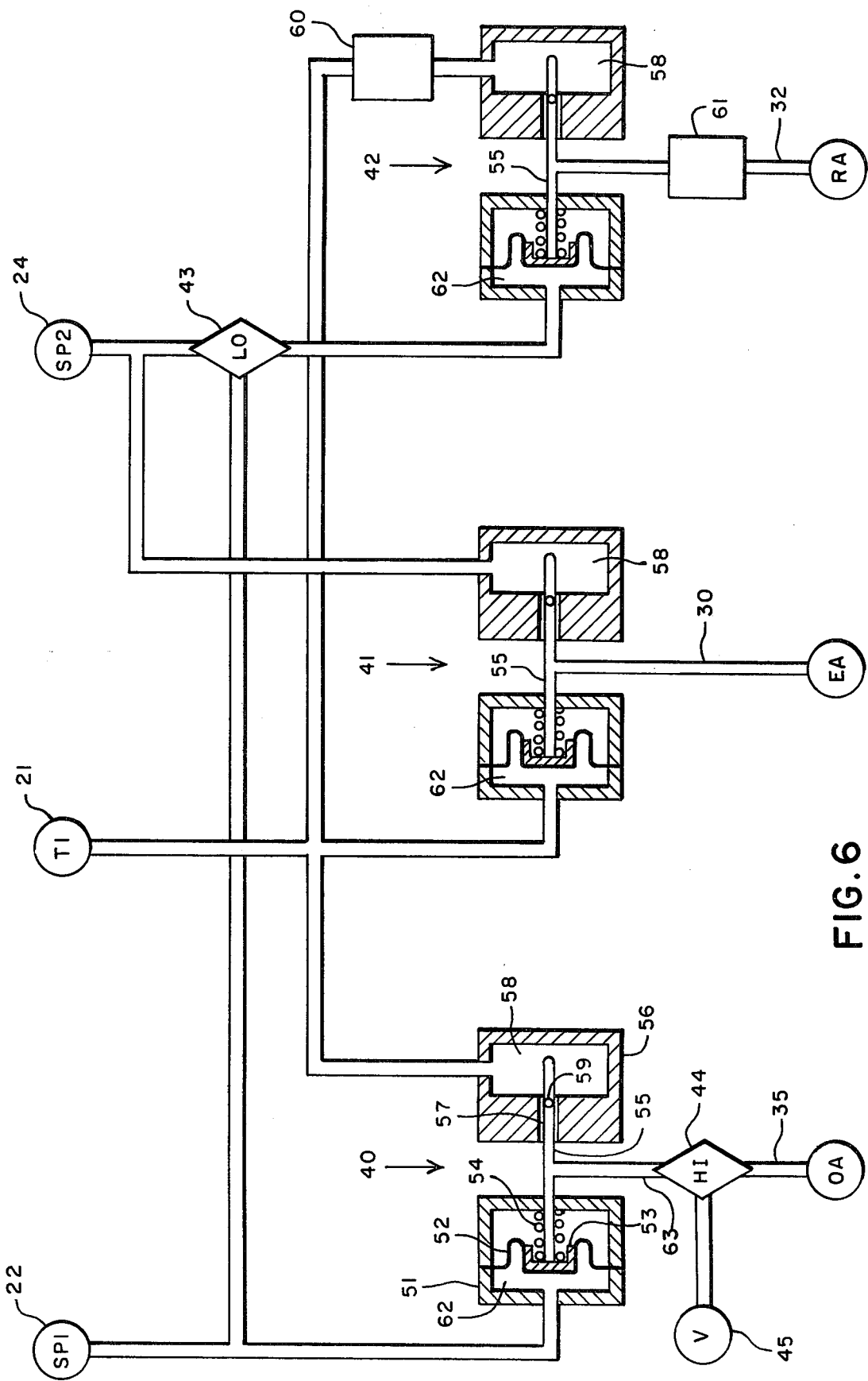

The circuit of FIG. 2 is shown in more detail in FIG. 6. The variable gain amplifiers are further shown in more detail in copending U.S. Pat. application Ser. No. 621,183 filed Oct. 9, 1975. Variable gain amplifier 40 has a first housing, 51, having an inlet port connected to static pressure sensor 22. The housing is divided by diaphragm 52 having suitably attached thereto cup shaped member 53 biased by a spring 54. Suitably attached to member 53 is tube 55 extending into second housing 56 having an inlet port connected to the temperature sensor 21. Between tube 55 and the cylindrical hole 57 in the housing 56 is formed a pressure gradient between the pressure in chamber 58 established by thermostat 21 and a reference pressure such as atmosphere established at the other end of the cylindrical hole. Hole 59 in tube 55 connects a pressure, dependent upon its position along this pressure gradient, through the tube 55 to output line 63 which is connected to one input of highest pressure selector 44. Variable gain amplifiers 41 and 42 are similarly arranged except that amplifier 42 has a reverse acting relay 60 connected between the chamber 58 and temperature sensor 21 and a further reversing relay 61 connected between tube 55 and output line 32. These reversing relays may be RP972 relays manufactured by Honeywell Inc. These relays are designed to reverse at their outputs the action of their inputs. For example, if the input to the relay is increasing, the output will be decreasing.

OPERATION

Assuming the temperature of the air discharged by fan 19 to be increasing, the output from temperature sensor 21 will also be increasing which, as shown in FIGS. 3, 4 and 5, will result in increasing outputs from variable gain amplifiers 40, 41 and 42. Specifically, an increasing pressure in chamber 58 of amplifier 40 will increase the pressure gradient and thereby increase the pressure in output line 63. An increasing pressure to chamber 62 of amplifier 41 will cause tube 55, and thereby hole 59, to be moved along the pressure gradient to a higher pressure which will result in a higher pressure in line 30. The increasing pressure from thermostat 21 is reversed by relay 60 which will result in a decreased pressure in chamber 58 and thereby a decreased pressure in tube 55 but, because of reversing relay 61, will result in an increased pressure in line 32. Since, as indicated in FIG. 2, the outdoor air damper 12 and exhaust air damper 27 are normally closed, these dampers will be operated to a more open position by the increasing pressures in lines 35 and 30. Since recirculated air damper 14 is a normally open damper, an increasing pressure in line 32 will operate this damper to a more closed position. Thus, more outdoor air and less recirculated air are mixed to thereby lower the temperature of the air supplied to the fan 19.

On the other hand, if temperature sensor 21 senses a decrease in the temperature of the air discharged by fan 19, lower pressures in lines 35, 30 and 32 will result which will operate dampers 12 and 27 to a more closed position and operate damper 14 to a more open position. Such operation will mix more recirculated air and less outdoor air for increasing the temperature of the air discharged by fan 19. Thus, when the condition or temperature of the air is to be regulated, the dampers 12 and 14 are operated in the opposite direction.

Assuming that the static pressure sensor 22 senses an increased static pressure in the output duct 20 from fan 19, which is indicative of an increased volume of air being discharged by fan 19, static pressure sensor 22, since it is a reverse acting sensor, produces a lower or decreasing output. This decreasing output will result in a decreasing pressure in chamber 62 of amplifier 40 which will cause the tube 55 to move to the left which results in the hole 59 picking off a lower pressure along the pressure gradient thereby resulting in a decreased pressure in line 63. Assuming that the pressure in line 63 is still above the pressure from source 45, the pressure in line 35 will also decrease to thereby operate the outdoor air damper 12 in a closing direction. Assuming the decreasing pressure sensor 22 is still lower than the pressure from sensor 24, the decreasing pressure from sensor 22 will result in a decreasing pressure in chamber 62 of amplifier 42 which will result in tube 55 moving to the left thereby picking off a lower pressure along the gradient. This decreasing pressure will, however, be reversed by reversing relay 61 and result in an increasing pressure in line 32. This increasing pressure, since as indicated in FIG. 2 the return air damper 14 is a normally open damper, will tend to also close the recirculated air damper 14. Since both outdoor air damper 12 and recirculated air damper 14 are operated in a closing sense, less volume of air will be supplied to the fan 19. Thus, when the volume of air is to be regulated, the dampers 12 and 14 are operated in the same direction.

Furthermore, if increased pressure is sensed by the sensor 24 and since sensor 24 is a direct acting sensor, an increased pressure sensed by sensor 24 will result in an increased pressure to chamber 58 of amplifier 41. Thus, the tube 55 will have an increased pressure which will supply an increased pressure to the exhaust air damper actuator 29 to operate the exhaust air damper 27 in an open direction to exhaust more air from the building to thereby reduce the static pressure within the zone 23. If decreased static pressure is sensed by sensor 24 a decreased pressure to amplifier 41 will decrease pressure to the exhaust damper 27 closing it, thereby increasing the static pressure within the zone 23. The decreased pressure from sensor 24 also goes to lowest pressure selector 43 and, if it is lower than the signal from static pressure sensor 22, it is connected to amplifier 42 and decreases its output to reversing relay 61 which increases pressure to the recirculated damper actuator 31 closing it thereby increasing the static pressure within the zone 23.

It is apparent that certain modifications of the present system can be made without departing from the scope of the invention as defined by the appended claims. Therefore, the invention is to be only limited by the appended claims.

The embodiments of the invention in which an enclusive property or right is claimed are defined as follows:

1. In an air conditioning system for supplying a volume of conditioned air to at least one zone, said system having a source of outdoor air and an outdoor air damper and a source of recirculated air and a recirculated air damper and discharge means for discharging a mixture of recirculated air and outdoor air to said at least one zone, a control apparatus adapted to control the condition and volume of air discharged by said discharge means comprising:
   first actuating means adapted to operate said outdoor air damper;
   second actuating means adapted to operate said recirculated air damper;
   sensing means for sensing said condition and volume of said mixture of recirculated air and outdoor air; and,
   control system means responsive to said sensing means and connected to said first and second actuating means for controlling the operation of said outdoor air and recirculated air dampers in an opposite sense to maintain a predetermined condition of said mixture of outdoor air and recirculated air and in the same sense to maintain a predetermined volume of said mixture of said outdoor air and said recirculated air to be discharged by said discharge means.

2. The apparatus of claim 1 wherein said sensing means comprises condition sensing means for providing an output dependent upon the condition of said mixture of outdoor air and recirculated air and volume sensing means for providing a signal dependent upon the volume of said mixture of outdoor air and recirculated air.

3. The apparatus of claim 2 wherein said control system means comprises variable gain amplifier means having first and second input means and output means wherein one of said first and second input means controls the gain of said variable gain amplifier means, first connecting means for connecting said condition sensing means to said first input means, second connecting means for connecting said volume sensing means to said second input means and third connecting means for connecting said output means to said first and second actuating means wherein said outdoor air and recirculated air dampers are adapted to control the condition and volume of the mixture of said outdoor air and said recirculated air.

4. The apparatus of claim 3 wherein said condition sensing means comprises a temperature sensor and said volume sensing means comprises static pressure sensing means.

5. The apparatus of claim 4 wherein said first connecting means comprises means for connecting said temperature sensor to said first input means and said second connecting means comprises means for connecting said static pressure sensing means to said second input means.

6. The apparatus of claim 5 wherein said static pressure sensing means comprises first and second static pressure sensors.

7. The apparatus of claim 6 wherein said variable gain amplifier means comprises first and second amplifiers, said first input means comprises first inputs to said first and second amplifiers and said second input means comprises second inputs to said first and second amplifiers, said first connecting means comprises first and second means for connecting said temperature sensor to said second inputs to said first and second amplifiers, said second connecting means comprises a first connector for connecting said first static pressure sensor to the first input of said first amplifier and lowest pressure sensor connecting means for connecting said first and second pressure sensing means to the second input of said second amplifier, said output means comprises a first output for said first amplifier and a second output for said second amplifier, and said third connecting means comprises means for connecting said first output to said first actuating means and means for connecting said second output to said second actuating means wherein said outdoor air and recirculated air dampers are adapted to control the condition and volume of said mixture of outdoor air and recirculated air.

8. The apparatus of claim 7 wherein said first output of said first amplifier includes minimum position means to prevent the outdoor air damper from being closed more than a predetermined minimum amount.

9. The apparatus of claim 7 wherein said first static pressure sensor is reverse acting.

10. The apparatus of claim 9 wherein said second static pressure sensor is direct acting.

11. In an air conditioning system for supplying a volume of conditioned air to at least one zone, said system having a source of outdoor air and outdoor air damper means, a source of recirculated air and recirculated air damper means, and a source of exhaust air and exhaust air damper means, and discharge means for discharging a mixture of recirculated air and outdoor air to said at least one zone, a control apparatus adapted to control the condition and volume of said mixture of recirculated air and outdoor air which is discharged by said discharge means to said at least one zone comprising:

first actuating means adapted to operate said outdoor air damper means;

second actuating means adapted to operate said recirculated air damper means;

third actuating means adapted to operate said exhaust air damper means;

sensing means for sensing the condition and volume of said mixture of outdoor air and recirculated air; and, control means responsive to said sensing means and connected to said first, second and third actuating means for controlling the operation of said outdoor air, recirculated air and exhaust air damper means such that said outdoor air and recirculated air damper means are controlled in an opposite sense to maintain a predetermined condition of said mixture of outdoor air and recirculated air and in the same sense to maintain a predetermined volume of said mixture of outdoor air and recirculated air which is discharged by said discharge means.

12. The apparatus of claim 11 wherein said sensing means comprises condition sensing means for providing an output dependent upon the condition of said mixture of outdoor air and recirculated air volume sensing means for providing a signal dependent upon the volume of said mixture of outdoor air and recirculated air.

13. The apparatus of claim 12 wherein said control system means comprises variable gain amplifier means having first and second input means and output means wherein one of said first and second input means controls the gain of said variable gain amplifier means, first and second connecting means for connecting said condition sensing means and said volume sensing means to said first and second input means respectively and third connecting means for connecting said output means to said first, second and third actuating means wherein said outdoor air, recirculated air and exhaust air damper means are adapted to control the condition and volume of the mixture of said outdoor air and said recirculated air.

14. The apparatus of claim 13 wherein said condition sensing means comprises a temperature sensor and said volume sensing means comprises static pressure sensing means.

15. The apparatus of claim 14 wherein said first connecting means comprises means for connecting said temperature sensor to said first input means and said second connecting means comprises means for connecting said static pressure sensing means to said second input means.

16. The apparatus of claim 15 wherein said static pressure sensing means comprises first and second static pressure sensors.

17. The apparatus of claim 16 wherein said variable gain amplifier means comprises first, second and third amplifiers, said first input means comprises first inputs to said first, second and third amplifiers and said second input means comprises second inputs to said first, second and third amplifiers, said first connecting means comprises a connector for connecting said temperature sensor to second inputs of said first and third amplifiers and said first input of said second amplifier, said second connecting means comprises a first connector for connecting said first static pressure sensor to the first input of said first amplifier, a second connector for connecting said second static pressure sensor to said second input of said second amplifier and lowest pressure sensor connecting means for connecting said first and second pressure sensing means to the first input of said third amplifier, said output means comprises a first output for said first amplifier, a second output for said second amplifier, and a third output for said third amplifier, and said third connecting means comprises means for connecting said first output to said first actuating means, means for connecting said second output to said second actuating means and means for connecting said third output to said third actuating means wherein said outdoor air, recirculated air and exhaust air damper means are adapted to control the condition and volume of said mixture of outdoor air and recirculated air.

18. The apparatus of claim 17 wherein said first output of said first amplifier includes a minimum position means to prevent the outdoor air damper means from being closed more than a predetermined minimum amount.

19. The apparatus of claim 17 wherein said first static pressure sensor is reverse acting.

20. The apparatus of claim 19 wherein said second static pressure sensor is direct acting.

* * * * *